United States Patent [19]

Hearn

[11] 3,882,724

[45] May 13, 1975

[54] FLOWMETER

[76] Inventor: William Rouse Hearn, Box 306, Clinton, Ontario, Canada

[22] Filed: May 4, 1973

[21] Appl. No.: 357,460

[52] U.S. Cl. ............................... 73/215
[51] Int. Cl. ........................... G01f 1/00
[58] Field of Search ..................... 73/215, 216

[56] References Cited
UNITED STATES PATENTS

| | | | |
|---|---|---|---|
| 1,067,491 | 7/1913 | Simmance et al. | 73/215 |
| 2,165,705 | 7/1939 | Houser | 73/215 |
| 2,781,660 | 2/1957 | Gobel | 73/215 |

FOREIGN PATENTS OR APPLICATIONS

| | | | |
|---|---|---|---|
| 542,784 | 1/1942 | United Kingdom | 73/216 |
| 307,750 | 5/1933 | Italy | 73/216 |

Primary Examiner—James J. Gill
Attorney, Agent, or Firm—C. C. Kent

[57] ABSTRACT

A meter for measuring the flow of liquid under gravity consists of an outer supply chamber which surrounds an inner chamber the bottom of which is open to atmosphere; the wall of the inner chamber has a proportional weir and a scale on the outer chamber indicates the flow through the meter at levels which correspond with the level of liquid in the outer chamber.

1 Claim, 3 Drawing Figures

FLOWMETER

FIELD OF THE INVENTION

This invention relates to meters and has particular relation to providing a gravity type meter which will measure the flow of material supplied in a controlled manner from a storage tank.

PRIOR ART

In recent years it has become the practice to add liquid protein supplements, hereinafter called L.P.S. to feedstuffs for beef and dairy animals. The L.P.S. is stored in a tank adjacent the feeding area and a predetermined weight is added to the feed. A way to determine and control this amount of L.P.S. is to employ a meter controlled by a valve but as far as can be determined all meters presently used to measure the flow of L.P.S. include a pumping unit which operates a digital type meter.

The viscosity of L.P.S. varies considerably with temperature and a gravity flow meter has to be capable of easy recalibration if the flow changes due to the change in viscosity.

It is an object of the invention to provide a meter having no moving parts which will measure the flow of L.P.S. moving along a conduit under the influence of gravity.

It is a further object of the invention to provide a gravity flow meter which can be easily calibrated in the field to take into account viscosity changes in the L.P.S. which result from changes in temperature.

SUMMARY OF THE INVENTION

The gravity flow meter of the invention incorporates a weir. In the form described below a proportional weir is used, based on that first designed by E. W. Rettger and published under the title "A Proportional Flow Weir" Engineering News, Vol. 71, No. 26, June 26, 1914. The design of this type of weir is such that flow through the opening varies directly with the height of the liquid passing over the base of the opening. More particularly the meter consists of outer and inner chambers having openings to atmosphere with the vertically disposed wall of the inner chamber incorporating a proportional weir, the flow through which can be viewed through the wall of the outer chamber. The liquid flow through the meter is controlled by a valve.

A scale is mounted on the exterior of the vertical wall of the outer chamber and the proportional weir is designed so that flow through the weir opening of L.P.S. at a predetermined temperature is indicated by weight on the level of the scale which corresponds with the level of L.P.S. passing over the weir.

The average temperature of L.P.S. delivered to the feed is 60°F. The weir is selected to indicate weight flows, preferably between 10 and 40 lbs. per minute and calibration is effected by inscribing a horizontal line on the wall of the outer chamber which indicates the level at which 10 lbs. of L.P.S. at 60°F passes per minute through the meter.

BRIEF DESCRIPTION OF THE DRAWINGS

The invention will now be described in relation to the accompanying drawings in which.

DESCRIPTION OF A PREFERRED EMBODIMENT

Figure 3:
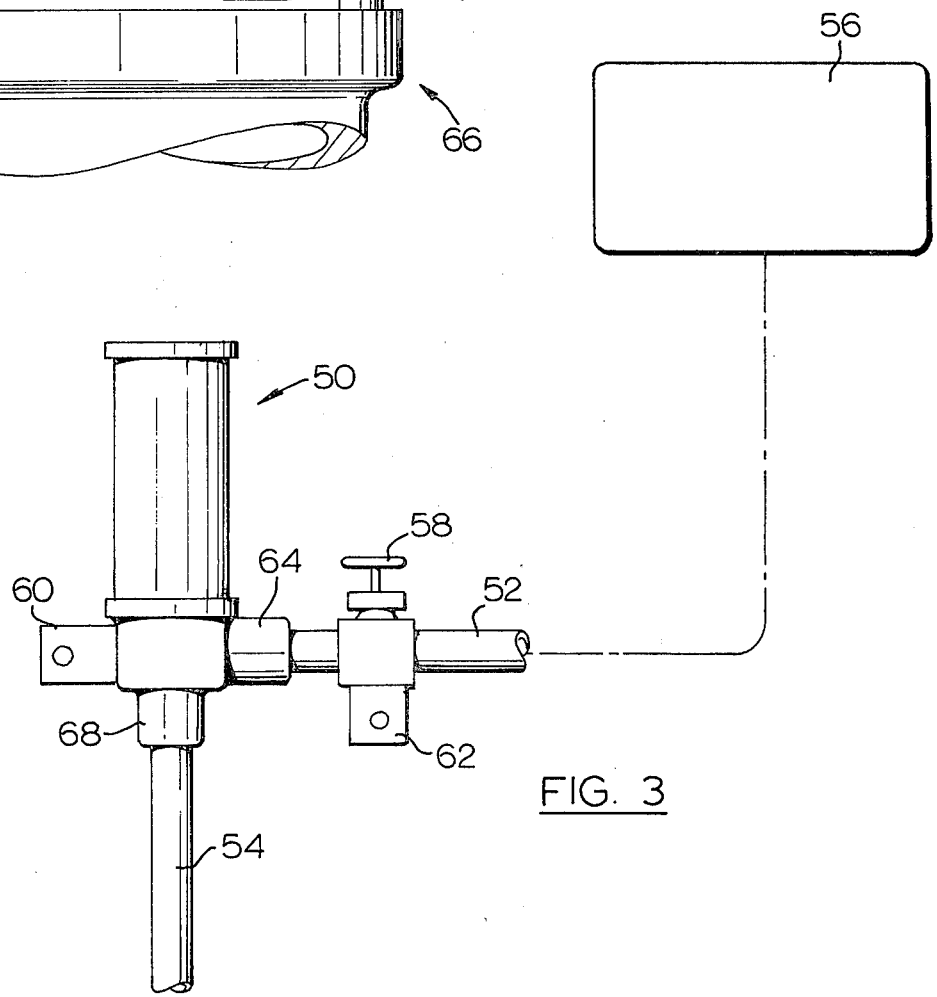
FIG. 3 is a schematic representation of the meter in position in relation to a storage tank and control valve.

The meter generally denoted by the numeral 50 is connected to an inlet pipe 52 and a drop pipe 54 as illustrated in FIG. 3. The other end of the inlet pipe 52 is connected to a storage tank 56 and the gravity feed of L.P.S. along the inlet pipe 52 is controlled by a valve 58. The meter 50 is maintained in a vertical position below the storage tank 56 by clamps 60 and 62, see FIG. 3.

The inlet pipe 52 is male threaded and engages a female threaded inlet boss 64 which extends horizontally and is an integral part of a circular hollow casting generally denoted by the numeral 66. The drop pipe 54 is also male threaded and engages with a vertically disposed female threaded boss 68 which is also integral with the hollow casting 66 and extends downward therefrom. The inner surface of the hollow casting 66 is provided with a step 70 above the boss 68.

The hollow casting 66 is open at the top and the thickened upper edge has upstanding inner and outer flanges 70 and 72. The recess between these flanges contains a rubber seal 74.

The step 70 supports the lower edge of an upwardly extending hollow cylindrical chamber 76 in which a vertical section of the wall has been cut away to provide an aperture which is sealed by a plate 78 made of transparent plastic. A first upper proportional weir 80 is located in the plate 78. The base 82 of the weir 80 has a central opening which communicates with a second lower proportional weir 84 of less height than the weir 80.

Figure 1:
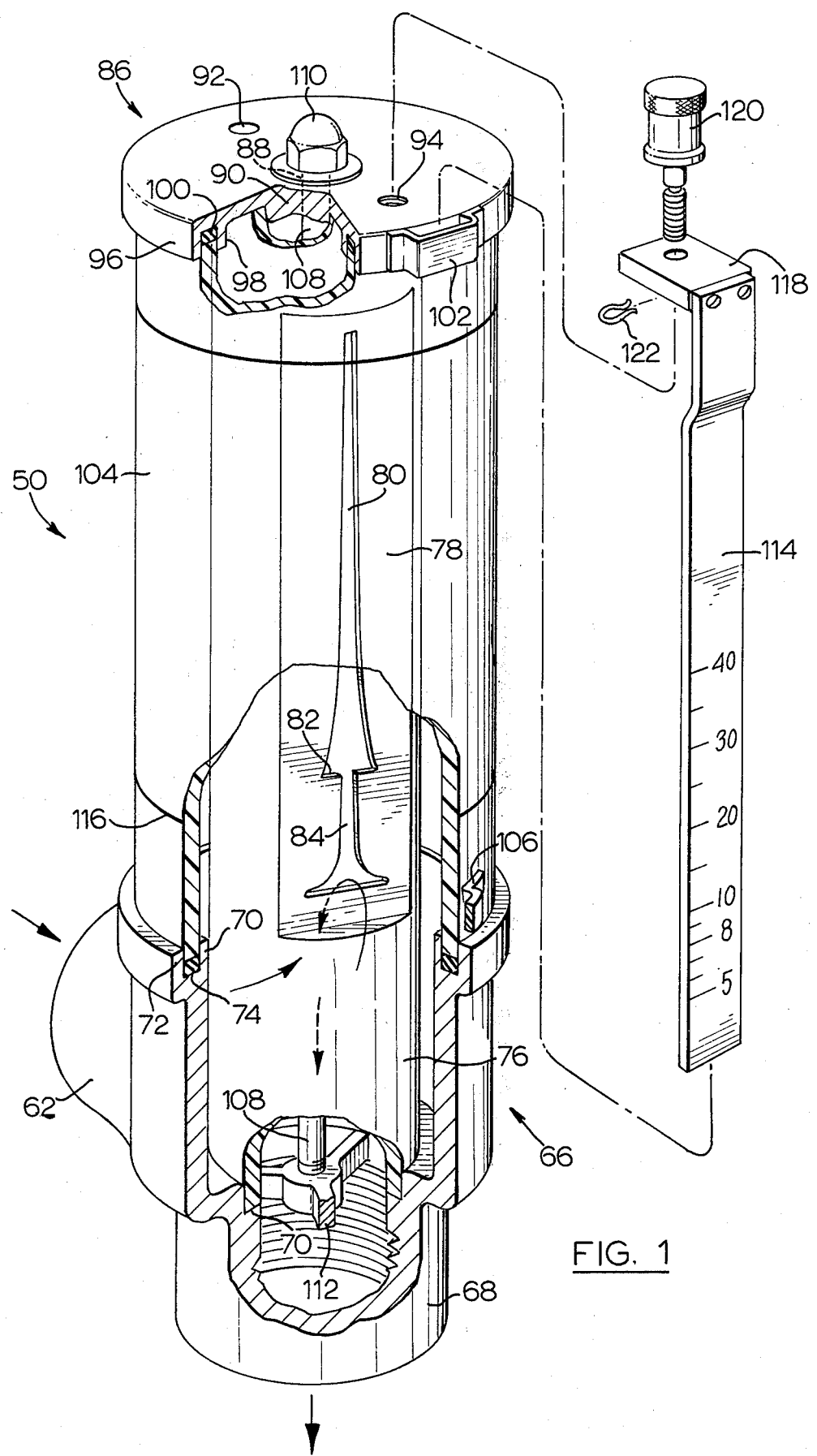
FIG. 1 is an exploded perspective view partially cut away to more clearly illustrate the meter of the invention.
Figure 2:
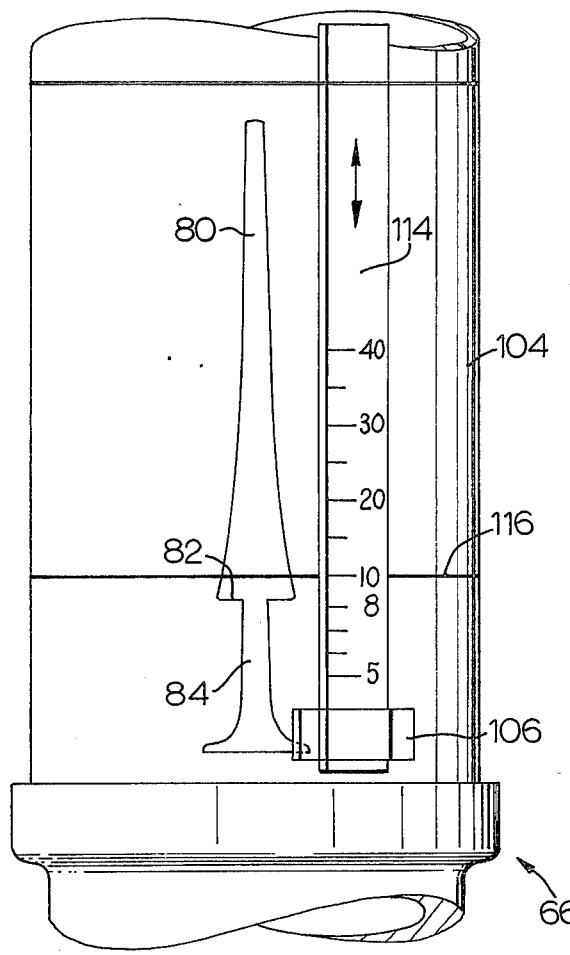
FIG. 2 is an enlarged view of the scale in position against the proportional weir when the scale is set for L.P.S. flowing at 60°F.

Surmounting the cylindrical chamber 76 is a cover generally denoted by the numeral 86 and shown more particularly in FIG. 1. The cover 86 has a central aperture 88. A downwardly extending circular flange 90 surrounds the aperture 88 and when the cover 86 is in position the upper edge of the cylindrical member 76 bears against the edge of the flange 90. A pair of opposed apertures 92 and 94 are provided in the cover 86 outward of the flange 90; the aperture 94 is threaded.

The cover 86 has a peripheral flange 96 and inward thereof is another flange 98. A rubber ring 100 is located in the recess between the flanges 96 and 98. The edge of the cover 86 has a bracket 102. The portion of the cylindrical chamber 76 which extends above the hollow casting is surrounded in spaced apart relationship by a second cylindrical chamber 104 which has a bracket 106 on its outer surface. The lower edge of the outer cylindrical chamber 104 is located in sealed relationship with the rubber seal 74 of the hollow casting 66 while the upper edge of the outer cylindrical chamber 104 is located also in sealing relationship against the rubber ring 100 of the cover 86. The outer cylindrical chamber 104 is transparent and preferably made of a suitable plastic.

The parts of the meter 50 already described are held in assembled relationship by a rod 108 threaded at both ends which extends upwards from the interior of the hollow casting 66 through the inner cylindrical member 76 and then through the central aperture 88 of the cover 86 against which the upper end of the rod 108 is secured by a nut 110. The lower end of the threaded rod 106 carries a winged nut 112 operative against a suitable abutment not shown, located in the hollow casting 66.

The cover 86 and the outer cylindrical chamber 104 are secured together so that the brackets 102 and 106 are in alignment to receive a scale 114 which is marked to indicate the weight of L.P.S. of a predetermined temperature passing through the weir per minute on the upstream side in the direction of the arrows at a level observed in the outer cylindrical chamber 104. The height of the weirs 80 and 84 are selected to permit the range of flow rates shown on the scale 114 when the L.P.S. is at 60°F. The calibration of the meter 50 for this temperature is indicated by a line 116 inscribed in the surface of the outer cylindrical chamber 104 at which level 10 lbs. of L.P.S. per minute at 60°F will pass through the meter 50.

Since the change in flow in the base portion 82 of a proportional weir 80 is difficult to observe the expedient was adopted of using the second lower weir 84 communicating with the upper weir 80 to indicate at levels on the lower weir 84, weights proportionally below 10 lbs. per minute. It will be appreciated that the meter 50 of the invention is limited neither to the particular scale 114 nor the arrangement of two weirs 80 and 84 shown and described. The selection simply depends on the available height of the meter 50 and the quantities which it is necessary to measure in practice; one weir could be designed to provide the proportional measurement.

To provide for differences in the viscosity of the L.P.S. due to changes in temperature the scale 114 is made adjustable through securement to an apertured plate 118. A knurled headed screw 120 passes through the plate 118 and engages the threaded aperture 94 in the cover 86. A spring clip 122 located under the plate 118 to embrace the shank of the screw 120 thus enables the scale 114 to be raised or lowered in well known manner.

If the viscosity of the L.P.S. changes the meter 50 can be easily recalibrated by weighing the amount of L.P.S. passing through the meter when the level is at the inscribed line 116, and then adjusting the position of the scale 114 accordingly.

Since it is a requirement of the meter 50 that it discharges freely to atmosphere, the aperture 92 in the cover 86 enables air to leave or enter the outer chamber 104. While the meter 50 is designed to operate primarily under gravity conditions, a pump can be incorporated in the system leaving the operation of the meter unaffected.

The weir described above incorporates a proportional weir but it will be appreciated that a non-proportional weir could be used, e.g. V-notch or rectangular, and a suitable scale employed on the upstream side. Furthermore, the meter could be designed so that the flow is in the other direction, i.e. from the inner chamber 76 to the outer chamber 104.

What is claimed is:

1. A gravity feed meter to measure the flow of liquid material from a supply comprising a first chamber having a vertically disposed wall, a first proportional weir in said wall, a second chamber surrounding first chamber in spaced apart relationship, the lower end of one of the said chambers being connected to said supply, said one chamber having an opening to atmosphere with said liquid material flowing upward therein, through said weir into and downward by gravity out to the other chamber, a vertically disposed scale on one of said chambers, said wier being calibrated to deliver predetermined amounts of liquid material at a predetermined temperature at levels indicated on said scale; a second proportional weir below said first proportional weir in said wall of said first chamber, the top of said second proportional weir communicating with the bottom of said first proportional weir, said second proportional weir facilitating the reading of smaller amounts of liquid material than that passing through the first proportional weir.

* * * * *